United States Patent Office 3,475,138
Patented Oct. 28, 1969

3,475,138
METHOD OF MAKING BORON-NITROGEN COMPOUNDS
Dorothy Ann Livingston Carvalho, Bridgeport, Conn., assignor to American Cyanamid Company, Stamford, Conn., a corporation of Maine
No Drawing. Filed Aug. 22, 1962, Ser. No. 220,589
Int. Cl. C01b 6/08
U.S. Cl. 23—358                      11 Claims This invention relates broadly to a method of making boron-nitrogen compounds and, more particularly, boron hydride ligand compounds. Still more particularly the invention is concerned with an improved method of preparing $B_9H_{13} \cdot$ ligand compounds represented by the general formula (I)                    $B_9H_{13} \cdot Y$ where Y represents a member of the group consisting of ammonia and hydrocarbon amines. These ligand compounds are useful, for example, as components of propellant compositions, including rocket-propellant compositions, and as intermediates in the chemical synthesis of other compounds that are useful as components of propellant compositions, including rocket-propellant compositions, and for other purposes.

It was known prior to the present invention that compounds of the kind embraced by Formula I could be prepared. One method of making such compounds is broadly and specifically claimed in the copending application of Lawrence E. Benjamin, filed concurrently herewith and assigned to the same assignee as the present invention. The method disclosed and claimed by Benjamin involves the conversion of, for example, ammonium nonaborohydride-14 under heat and while dissolved or dispersed in a suitable liquid reaction medium, e.g., benzene, into ammonia nonaborane-13 accompanied by the evolution of one molecule of hydrogen, i.e., $H_2$. In general, the methods heretofore known for producing compounds of the kind embraced by Formula I were such that the desired end-product was the last in a series of reactions wherein decaborane was employed as a starting reactant. As will be readily understood by those skilled in the art, such methods are time-consuming and, therefore, relatively costly.

It is a primary object of the present invention to provide a simple and economical means whereby ammonia nonaborane-13 and other compounds of the kind encompassed by Formula I can be produced in less time than heretofore was possible and in satisfactory yields.

Another object of the invention is to provide a method of making ammonia and hydrocarbon-amine nonaborane-13 ligand compounds of high purity from readily available starting materials using conventional equipment.

Another object of the invention is to provide a direct, two-step method of making ligand compounds of the kind embraced by Formula I using a single reaction vessel in carrying out the steps.

Other objects of the invention will be apparent to those skilled in the art as the description of the invention proceeds.

The present invention is based on my discovery that compounds of the kind encompassed by Formula I can be prepared directly from decaborane, $B_{10}H_{14}$, and ammonium hydroxide (or a solution of a hydrocarbon-substituted amine) in a two-step procedure which can be conducted in the same reaction vessel. High yields of the desired ligand compound are obtained, especially when the preferred embodiment of the invention is used.

Taking ammonia nonaborane-13 as illustrative of the ligand compound to be produced, the procedure may be briefly described as follows:

Decaborane in finely divided state, more particularly sublimed decaborane, is added to a reaction vessel containing an aqueous ammonium hydroxide solution. The decaborane dissolves rapidly to give a yellow, homogeneous solution that gradually turns colorless accompanied by the evolution of hydrogen gas. When hydrogen evolution has been substantially completed, i.e., when about one mole equivalent of hydrogen has been evolved, the reaction mass is evaporated to dryness. The white residue comprises ammonium nonaborohydride-14, $NH_4^+B_9H_{14}^-$. Benzene is added to the reaction vessel containing the aforesaid residue, and the resulting benzene solution or dispersion of the residue is heated, for example at the boiling temperature of the reaction mass, until about one molar equivalent of hydrogen has been evolved.

The benzene-insoluble material is filtered from the reaction mass, and the benzene is evaporated from the filtrate under reduced pressure to isolate ammonia nonaborane-13 as a white, crystalline solid. It is believed that the reaction proceeds as illustrated by the following equation:

(II)
$B_{10}H_{14} + NH_4OH \longrightarrow$ $NH_4^+B_{10}H_{13}^- \longrightarrow NH_4^+B_9H_{14}^- \xrightarrow[\text{benzene}]{\Delta} B_9H_{13} \cdot NH_3$ The invention may be described more broadly as involving a method comprising bringing into reactive relationship (e.g., by admixing as by stirring and/or blowing with an inert gas), at a temperature within the range of from about 20° C. to about 50° C., (1) one mole equivalent of decaborane and (2) a solution containing at least one mole equivalent of at least one member of the group defined by Y in Formula I. To obtain mixtures of nonaborane-13 ligand compounds, mixtures of ammonia and a hydrocarbon amine can be employed in any proportions. Advantageously the solution (preferably an aqueous solution) comprising ammonia and/or a hydrocarbon amine is used in ratios of from 2 to about 8 mole equivalents of ammonia and/or hydrocarbon amine per mole of decaborane. Although I prefer to use a solution comprising ammonia and/or a hydrocarbon amine wherein the solvent is solely water, it is not essential that this be done. For example, instead of such a solution of the ammonia or amine reactant, one can use a solution wherein the solvent is, for example, a lower alkyl (e.g., methyl through amyl, inclusive, both normal and isomeric forms) alcohol, or a mixture of such alcohols with water in any proportions. Aqueous solutions containing various ethers, more particularly the various cyclic ethers, e.g., tetrahydrofuran, dioxane, etc., also can be used in making the solution of the ammonia or hydrocarbon amine.

The reaction between the reactants of (1) and (2), supra, is continued until about one mole equivalent of hydrogen ($H_2$) has been evolved. The reaction product is then isolated by any suitable means from the resulting reaction mass. The reaction product comprises a nonaborohydride salt represented by the general formula (III)                  $MH^+B_9H_{14}^-$ where M represents ammonia or a hydrocarbon amine (hydrocarbon-substituted amine). It can be isolated from the reaction mass by, for example, evaporation of the solvent at normal or reduced pressure; or, particularly in the case of the amine reaction products, by precipitating the product with a non-solvent thereof and filtering off the precipitated material.

Illustrative examples of hydrocarbon amines represented by Y in Formula I and by M in Formula III are the mono-, di- and tri-(aliphatic hydrocarbon)-amines, both saturated and unsaturated, including the mono-, di- and tri-(cycloaliphatic hydrocarbon)amines, both saturated and unsaturated, e.g., the mono-, di- and triethyl through mono-, di- and tri-(dodecyl)amines, the mono-, di- and triallyl, -methallyl, -crotyl, etc., amines; the mono-, di- and tricyclopentyl, -cyclopentenyl, -cyclohexyl, -cyclohexenyl, -cycloheptyl, -cycloheptenyl, etc., amines; the various mono-, di- and triaralkylamines, e.g., mono-, di- and tribenzylamines, mono, di- and triphenylethylamines, etc.; pyridine, piperidine and the various hydrocarbon-substituted pyridines and piperidines; and others that will be obvious to those skilled in the art from the foregoing illustrative examples.

The aforementioned reaction product comprising the salt embraced by Formula III is then admixed with an inert, organic, liquid reaction medium, and the resulting admixture is heated at a temperature ranging from above ambient temperature, more particularly room temperature (about 20°–30° C.), up to the boiling temperature of the reaction mass, until about one additional mole equivalent of hydrogen has been evolved. The resulting solution containing the nonaborane-13 ligand compound is then generally filtered to remove insoluble material, after which the ligand compound represented by Formula I is isolated from the filtrate by any suitable means, for example by evaporation or distillation of the liquid reaction medium at normal or reduced pressures, depending upon the particular boiling point of the reaction medium employed.

By "inert" or "substantially completely inert," liquid reaction medium as used herein and in the appended claims is meant one which is so inert or non-reactive toward the reactants and the reaction product that it will not adversely affect the course of the reaction or the constitution of the reaction product. By "liquid reaction medium" is meant one which is liquid at the temperature and pressure employed in effecting the reaction. In other words, the inert, liquid, reaction medium in which the reaction is preferably effected may or may not be a liquid at any temperature below the reaction temperature. Preferably the liquid reaction medium employed is one which is volatile (volatilizable) without decomposition.

Illustrative examples of inert, organic, liquid, reaction media that can be employed in practicing the present invention are benzene, toluene, xylene, pentane, hexane, heptane, octane, nonane, decane, dodecane, tetradecane and hexadecane. Other examples include the commercially available petroleum ethers boiling above about 35° C. Good results have been obtained when the inert, organic, liquid reaction medium is an inert, liquid, aromatic hydrocarbon, specifically benzene.

The amount of inert, liquid, reaction medium employed in carrying out the conversion of the nonaborohydride-14 salt into a nonaborane-13 ligand compound may be varied as desired or as conditions may require, but ordinarily the amount thereof is such that the reactants constitute up to about 20%, more particularly from about ½% to about 20% by weight thereof.

In order that those skilled in the art may better understand how the present invention can be carried into effect, the following examples are given by way of illustration and not by way of limitation. All parts and percentages are by weight unless otherwise stated.

EXAMPLE 1

Preparation of ammonia nonaborane-13, $B_9H_{13} \cdot NH_3$

To a suspension of 1.22 g. (10 mmoles) of decaborane in 7 ml. of water is added, with stirring, an aqueous solution of ammonium hydroxide (20 mmoles) which is made by diluting 2.4 ml. of a 29% solution with 8 ml. of water. The yellow color, characteristic of the $B_{10}H_{13}^-$ anion, develops as the decaborane goes into solution. Within two hours the yellow color has disappeared and 200 cc. of gas ($H_2$) has been evolved. The white solid residue remaining after removal of the water under vacuum is heated in refluxing benzene until an additional 250 ml. of gas has been collected (2–3 hours). After being filtered from insoluble solids, the benzene solution is evaporated to dryness to give 0.93 g. of crude ammonia nonaborane-13. Yield, 73% of the theoretical. Two recrystallizations from benzene furnish the analytical sample.

*Analysis.*—Calc'd for $B_9H_{16}N$: C, 0.00; H, 12.65; N, 10.99; B, 76.36. Found: C, 0.36, 0.00; H, 11.70, 11.57; N, 10.63; B, 76.86.

Repetition of the foregoing procedure a number of times, using the same molar ratio of reactants, has provided ammonia nonaborane-13 in yields ranging from about 66% to about 79%.

EXAMPLE 2

Preparation of ammonia nonaborane-13

The same procedure is followed as described under Example 1 with the exception that an aqueous solution containing 10 mmoles of ammonium hydroxide is employed instead of 20 mmoles as in Example 1. In other words, the decaborane and ammonium hydroxide are employed in a 1:1 molar ratio. Similar results are obtained.

EXAMPLE 3

Preparation of trimethylamine nonaborane-13, $B_9H_{13} \cdot N(CH_3)_3$

Into a reaction vessel is placed 0.122 g. (1 mmole) of decaborane, and to it is added 4 mmoles of trimethylamine in a 25% methanol solution. The solution is allowed to stand at room temperature (20°–30° C.) until 27 ml. of gas ($H_2$) has been evolved. Thereafter the solution is evaporated to dryness under vacuum to obtain a residue comprising trimethylammonium nonaborohydride-14, $(CH_3)_3NH^+B_9H_{14}^-$. This residue is taken up in about 50 ml. benzene, and the resulting solution is heated under reflux at the boiling temperature of the reaction mass until 37 ml. of gas ($H_2$) has been collected. At the end of this period of time the evolution of gas has substantially ceased, whereupon the solution is filtered to remove insoluble material. The filtrate is evaporated to dryness. The residue comprises trimethylamine nonaborane-13. Yield, 0.114 g., which corresponds to about 67% of the theoretical.

EXAMPLE 4

The same general procedure is followed as described in Example 3 with the exception that, instead of 4 mmoles of trimethylamine, there is individually used in separate reactions 4 mmoles of each of the following amines: methylamine (monomethylamine), dimethylamine, diethylamine, triamylamine, tricyclohexylamine, diallylamine, methallylamine (monomethallylamine), dicyclopentenylamine, dibenzylamine, and tribenzylamine.

In each case the reaction of the amine with the decaborane is continued until about one molar equivalent of hydrogen has been evolved. Similarly, refluxing of the benzene solution of the nonaborohydride-14 salt is continued until approximately one molar equivalent of hydrogen has been evolved.

EXAMPLE 5

This example illustrates the preparation of ammonia nonaborane-13 using ammonium hydroxide and decaborane in a ratio of four moles of the former to one mole of the latter.

Ten (10) mmoles of sublimed decaborane is stirred in a round-bottomed reaction vessel with 40 mmoles of aqueous ammonium hydroxide solution (17 ml.) at room temperature (20°–30° C.). The decaborane dissolves rapidly and the solution turns light yellow. After 243 ml. of gas ($H_2$) has been collected, the now colorless, homogeneous solution is evaporated to dryness under reduced pressure. The residue that remains is heated in 35 ml. of refluxing benzene for 21 hours, during which period 580 ml. of additional hydrogen gas is evolved. The cooled benzene solution is then filtered to remove benzene-insoluble material, and the filtrate is evaporated to dryness. There remains 0.87 g. (68% of the theoretical) of ammonia nonaborane-13, which is identified as such by its infrared spectrum.

EXAMPLE 6

Preparation of pyridine nonaborane-13, $B_9H_{13} \cdot NC_5H_5$

To a reaction vessel containing 1.22 g. (10 mmoles) of decaborane is added dropwise 10 mmoles of pyridine in 5 ml. of methanol. After all the pyridine has been added and gas ($H_2$) evolution has ceased, the resulting yellow solution is cooled and water is added thereto until a crystalline material has precipitated. This material is filtered off, dried and taken up in benzene. The resulting benzene solution is heated under reflux at the boiling temperature of the reaction mass until no more gas ($H_2$) evolves. Evaporation of the benzene solution yields a solid material which is identified by infrared analysis as pyridine nonaborane-13.

EXAMPLE 7

Preparation of piperidine nonaborane-13

The same procedure is followed as described under Example 6 with the exception that 10 mmoles of piperidine is used instead of 10 mmoles of pyridine. The final product is identified by infrared analysis as piperidine nonaborane-13.

I claim:

1. The method of preparing nonaborane-13 ligand compounds represented by the general formula $$B_9H_{13} \cdot Y$$

where Y represents a member of the group consisting of ammonia and hydrocarbon amines, said method comprising bringing into reactive relationship, at a temperature within the range of from about 20° C. to about 50° C., (1) one mole equivalent of decaborane and (2) a solution containing at least one mole equivalent of at least one member of the group defined by Y in the above formula; continuing the reaction between the ingredients of (1) and (2) until about one mole equivalent of hydrogen has been evolved; isolating from the resulting reaction mass the reaction product comprising a nonaborohydride-14 salt represented by the general formula $$MH^+B_9H_{14}^-$$

where M represents a member of the group consisting of ammonia and hydrocarbon amines; admixing the aforementioned reaction product with an inert, organic, liquid reaction medium; heating the resulting admixture at a temperature ranging from above ambient temperature up to the boiling temperature of the reaction mass, until about one additional mole equivalent of hydrogen has been evolved; and isolating a nonaborane-13 ligand compound represented by the above-given formula from the resulting reaction mass.

2. A method as in claim 1 wherein there is used an aqueous solution containing at least two mole equivalents of at least one member of the group defined by Y for each mole equivalent of decaborane, and the inert, organic, liquid, reaction medium is an inert, liquid hydrocarbon.

3. A method as in claim 2 wherein the reaction between decaborane and the aqueous solution containing the defined mole equivalents of at least one member of the group defined by Y in claim 1 is effected at ambient temperature.

4. A method as in claim 3 wherein the aqueous solution is one comprising at least two mole equivalents of ammonium hydroxide for each mole equivalent of decaborane, and the inert, liquid hydrocarbon is an inert, liquid, aromatic hydrocarbon.

5. A method as in claim 4 wherein the inert, liquid, aromatic hydrocarbon is benzene.

6. A method as in claim 1 wherein Y represents ammonia.

7. A method as in claim 1 wherein Y represents a hydrocarbon amine.

8. A method as in claim 7 wherein Y represents a tertiary hydrocarbon amine.

9. A method as in claim 8 wherein the tertiary hydrocarbon amine is a tertiary alkylamine.

10. A method as in claim 9 wherein the tertiary alkylamine is trimethylamine.

11. A method as in claim 8 wherein the tertiary hydrocarbon amine is pyridine.

References Cited

Fitch et al.: "Journal of The American Chemical Society," vol. 80, pp. 5911–5913 (1958).

Guter et al.: "Journal of The American Chemical Society," vol. 78, p. 3546 (1956).

Hawthorne et al.: "Abstracts of Papers, American Chemical Society, 138th Meeting," Bears stamped receipt date of Aug. 15, 1960, pp. 45N, 46N.

MILTON WEISSMAN, Primary Examiner

U.S. Cl. X.R.

260—583, 156